US012254532B1

(12) United States Patent
Ramdasi et al.

(10) Patent No.: US 12,254,532 B1
(45) Date of Patent: Mar. 18, 2025

(54) AUTOMATED COLOR CORRECTION OF STUDIO IMAGES TO PROVIDE A CONSISTENT STANDARD OF APPEARANCE

(71) Applicant: The RealReal, Inc., San Francisco, CA (US)

(72) Inventors: Pratik Mohan Ramdasi, Sunnyvale, CA (US); Hasan Cheema, San Francisco, CA (US); Agustin Mautone, Montevideo (UY); Fabrizio Albertoni, Montevideo (UY); Maria Paz Cuturi, Montevideo (UY)

(73) Assignee: The RealReal, Inc., San Francisco, CA (US)

( * ) Notice: Subject to any disclaimer, the term of this patent is extended or adjusted under 35 U.S.C. 154(b) by 148 days.

(21) Appl. No.: 18/092,304

(22) Filed: Dec. 31, 2022

(51) Int. Cl.
  *G06T 11/00* (2006.01)
(52) U.S. Cl.
  CPC ........ *G06T 11/001* (2013.01); *G06T 2210/22* (2013.01)
(58) Field of Classification Search
  CPC .......................... G06T 11/001; G06T 2210/22
  See application file for complete search history.

(56) References Cited

U.S. PATENT DOCUMENTS

| 8,294,781 | B2 | 10/2012 | Cote et al. |
| 9,712,743 | B2 | 7/2017 | Corcoran et al. |
| 9,911,242 | B2 | 3/2018 | Sundaresan et al. |
| 10,027,938 | B2 | 7/2018 | Fujiwara et al. |
| 10,783,615 | B2 | 9/2020 | Ma et al. |
| 2008/0088858 | A1 | 4/2008 | Marcu et al. |
| 2009/0059256 | A1* | 3/2009 | Hasegawa .......... H04N 1/00442 358/1.9 |
| 2018/0176528 | A1 | 6/2018 | Li et al. |
| 2022/0245900 | A1* | 8/2022 | Tan .......................... G06T 7/55 |

FOREIGN PATENT DOCUMENTS

| CN | 109040598 B | 8/2020 |
| JP | 4681529 B2 | 5/2011 |
| JP | 2020155907 A | 9/2020 |

* cited by examiner

*Primary Examiner* — Said Broome
*Assistant Examiner* — Andrew Shin
(74) *Attorney, Agent, or Firm* — Adibi IP Group, PC; Amir V. Adibi; Andrew C. Palmer

(57) ABSTRACT

A color correction system comprises a correction information generator and an image processor. The correction information generator generates color correction information from a color correction image associated with a plurality of images. The image processor automatically processes the plurality of images based on the color correction information to generate a plurality of color-corrected images. In operation, images and a color correction image associated with the images are received. Next, color correction information is generated from the color correction image. For example, color correction information includes a color correction matrix or white balance parameters. Next, the images are automatically processed based on the color correction information thereby generating color-corrected images. The system automates color correction processing of studio images to provide highly scalable and reliable color correction. Significant quantities of studio images are consistently color-corrected based on processing of the color correction image.

6 Claims, 12 Drawing Sheets
(3 of 12 Drawing Sheet(s) Filed in Color)

COLOR CORRECTION IMAGE

COLOR CORRECTION SYSTEM

COLOR CORRECTION IMAGE

COLOR CHECKER CARD

TABLE OF REFERENCE COLOR VALUES

METHOD FOR GENERATING CORRECTION INFORMATION

IMAGE PROCESSOR

METHOD FOR GENERATING COLOR
CORRECTED IMAGES

ALTERNATIVE CORRECTION INFORMATION GENERATOR

ALTERNATE METHOD FOR GENERATING CORRECTION INFORMATION

ALTERNATIVE EMBODIMENT OF
IMAGE PROCESSOR

EXAMPLE OF IMAGE BEFORE AND AFTER
AUTOMATED COLOR CORRECTION

AUTOMATED COLOR CORRECTION OF STUDIO IMAGES TO PROVIDE A CONSISTENT STANDARD OF APPEARANCE

TECHNICAL FIELD

The present invention relates generally to imaging systems, and more specifically, to image color correction systems.

BACKGROUND INFORMATION

Retail providers typically offer many types of items for sale and carry a significant variety of inventory. Such retailers often sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device.

After selecting an item of interest to view, the customer is presented with a Product Description Page (PDP). The PDP provides the customer with information in connection with the selected item of interest, including one or more images, price information, and a description of the item. The customer is able to purchase the selected item via the PDP. Color correction is a process where an image is altered to match a consistent standard of appearance. Color correction is essential to establish true colors and maintain color constancy across different photo studios in warehouses.

SUMMARY

In various embodiments, automated color correction of studio images is disclosed. In one embodiment, color correction is performed in a two-step process. In the first step, color correction information is determined from a color checker image associated with a photo set of images. In a second step, the color correction information is automatically applied to the images of the photo set to generate color-corrected images.

In one embodiment, the color correction information is generated as a color correction matrix that is used to correct the raw images of the photo set. In another embodiment, the color correction information is generated as a set of white-balance parameters that are used to correct the raw images of the photo set.

Both embodiments provide automatic color-correction processing of photo set images to provide efficient color correction in a way that is much faster than using manual color correction techniques. Thus, thousands of images can be easily, consistently, and automatically color-corrected based on processing of the color checker image.

In one embodiment, a method is provided that includes receiving a plurality of images and a color correction image associated with the plurality of images, generating color correction information from the color correction image, and automatically processing the plurality of images based on the color correction information to generate a plurality of color-corrected images.

In one embodiment, a color correction system comprises a correction information generator and an image processor. The correction information generator generates color correction information from a color correction image associated with a plurality of images. The image processor automatically processes the plurality of images based on the color correction information to generate a plurality of color-corrected images.

Further details and embodiments and methods are described in the detailed description below. This summary does not purport to define the invention. The invention is defined by the claims.

BRIEF DESCRIPTION OF THE DRAWINGS

The patent or application file contains at least one drawing executed in color. Copies of this patent publication with color drawing(s) will be provided by the Office upon request and payment of the necessary fee.

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
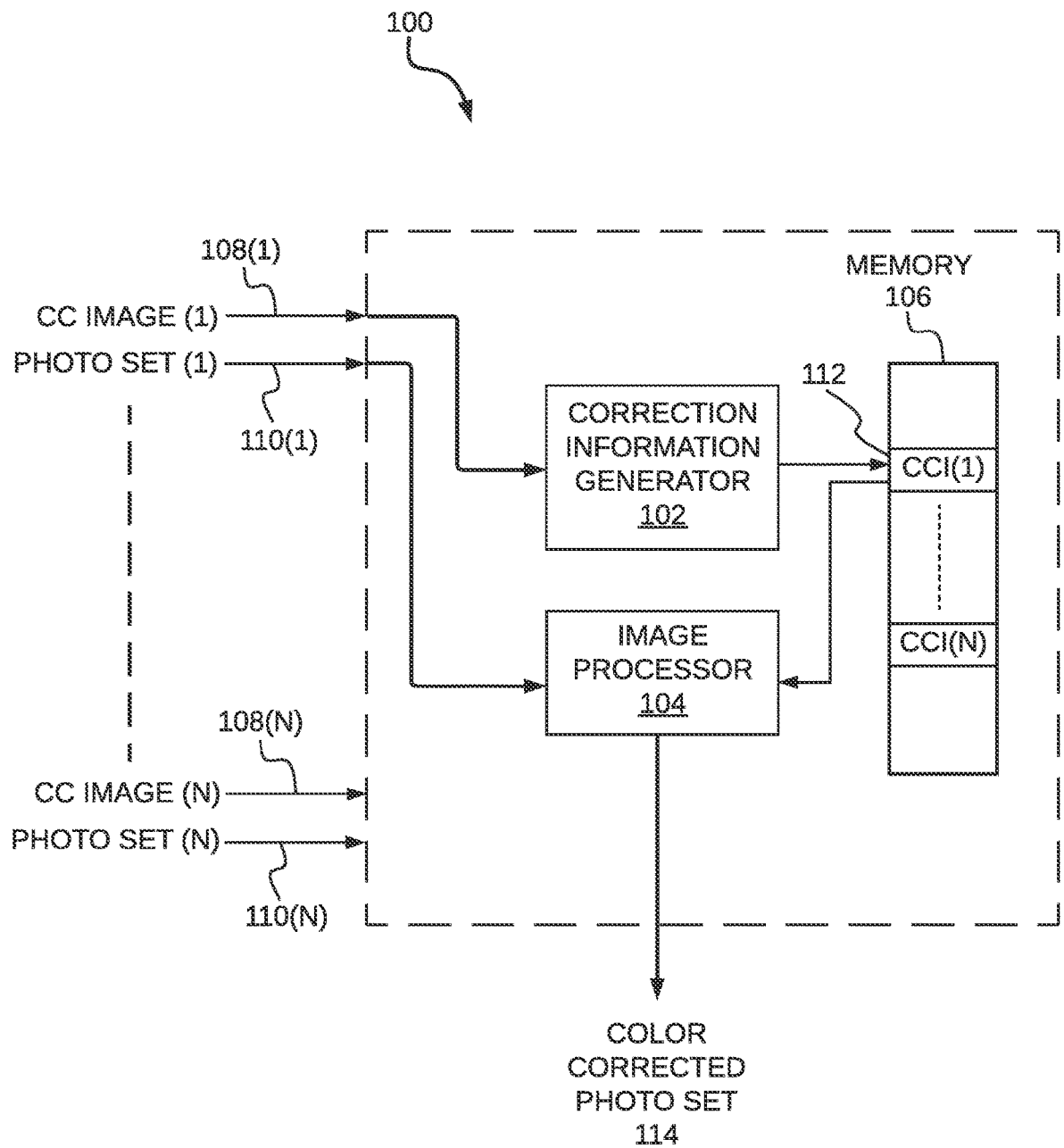
FIG. 1 is a diagram of a color correction system 100.

FIG. 1 is a diagram of a color correction system 100. In one embodiment, the color correction system 100 comprises correction information generator 102, image processor 104, and memory 106. During operation, the color correction system 100 receives a plurality of photo sets 110(1-N) and each photo set includes a corresponding color checker image 108(1-N). To color-correct the images in each photo set, the color checker image is input to the correction information generator 102, which generates color correction information (CCI) 112 that is stored in the memory 106. Next, the photo set is input to the image processor 104, which retrieves the color correction information 112 from the memory 106 and uses this information to adjust the colors of each image in the photo set to generate a color-corrected photo set 114. The plurality of photo sets 110(1-N) and their respective color checker images 108(1-N) are sequentially and automatically processed by the color correction system 100 to generate a plurality of color-corrected photo sets. The colors of the images within each photo set are adjusted to have consistent colors based on the color correction image associated with each set. Thus, the color correction system 100 can automatically color-correct thousands of photo sets to achieve consistent colors while overcoming the limitations of manual color correction.

Figure 2:
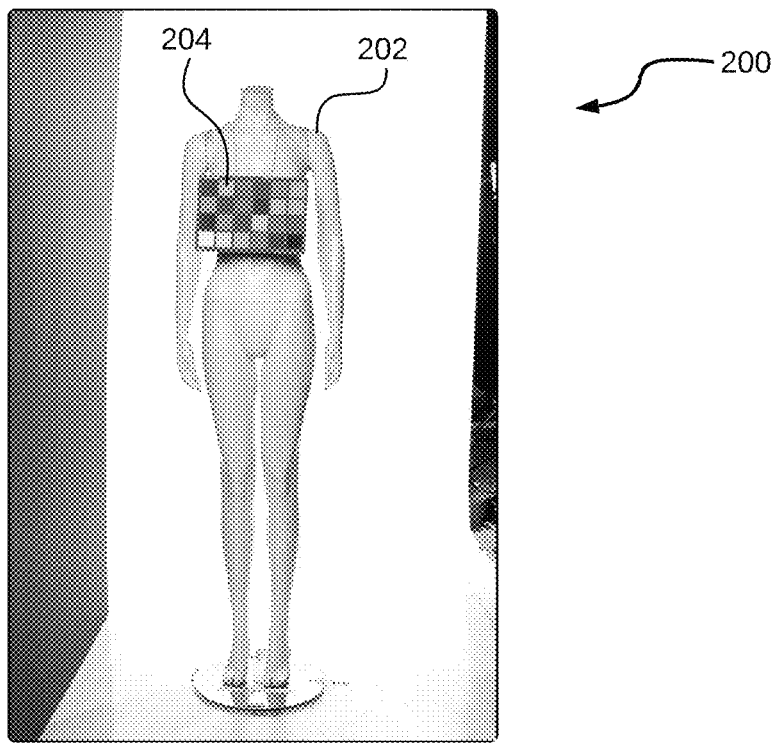
FIG. 2 shows an exemplary color correction image 200.

FIG. 2 shows an exemplary color correction image 200. The color correction image 200 shows an image of a studio for capturing product images. For example, the studio includes a mannequin 202, which can be used to photograph various articles of clothing or personal accessories. Hanging on the mannequin 202 is a color checker card 204, which is also referred to as a "passport" card. At some point before, during, or after photographing a photo set of product images, a photo of the color checker card 204 is taken and stored as the color checker (CC) image associated with the photo set. The color checker card 204 is captured under the same conditions as the product images in the photo set, including camera setting, day, photographer, and lighting. This ensures that the color checker card 204 is a reliable reference for color correction of the product images. The photo set and corresponding CC image are processed by the color correction system 100 to generate a color-corrected photo set. Thus, studios at a variety of locations are able to capture photo sets with corresponding CC images, and transmit the photo sets and CC images to a central location where the color correction system 100 is operating to process those images to generate color-corrected photo sets.

Figure 3:
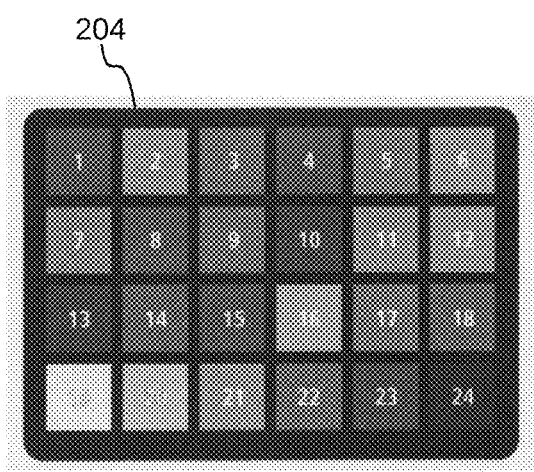
FIG. 3 shows a color checker card and a table that comprises reference color values for the segments of the color checker card.

FIG. 3 shows the color checker card 204 and a table 302 that comprises reference color values for the segments of the color checker card 204. The color checker card 204 comprises a set of 24 segments (e.g., segments 1-24 as shown in FIG. 3) or color patches representing 24 different colors. The table 302 provides the red/green/blue values that are represented by each patch. During the color-correction process, the color checker image is processed to detect the color checker card 204 and then to identify the patch segments. Pixel color values are taken from each patch segment and processed with the reference color values from table 302 to determine the color correction information that is stored and used to color-correct the images in the corresponding photo set.

Figure 4:
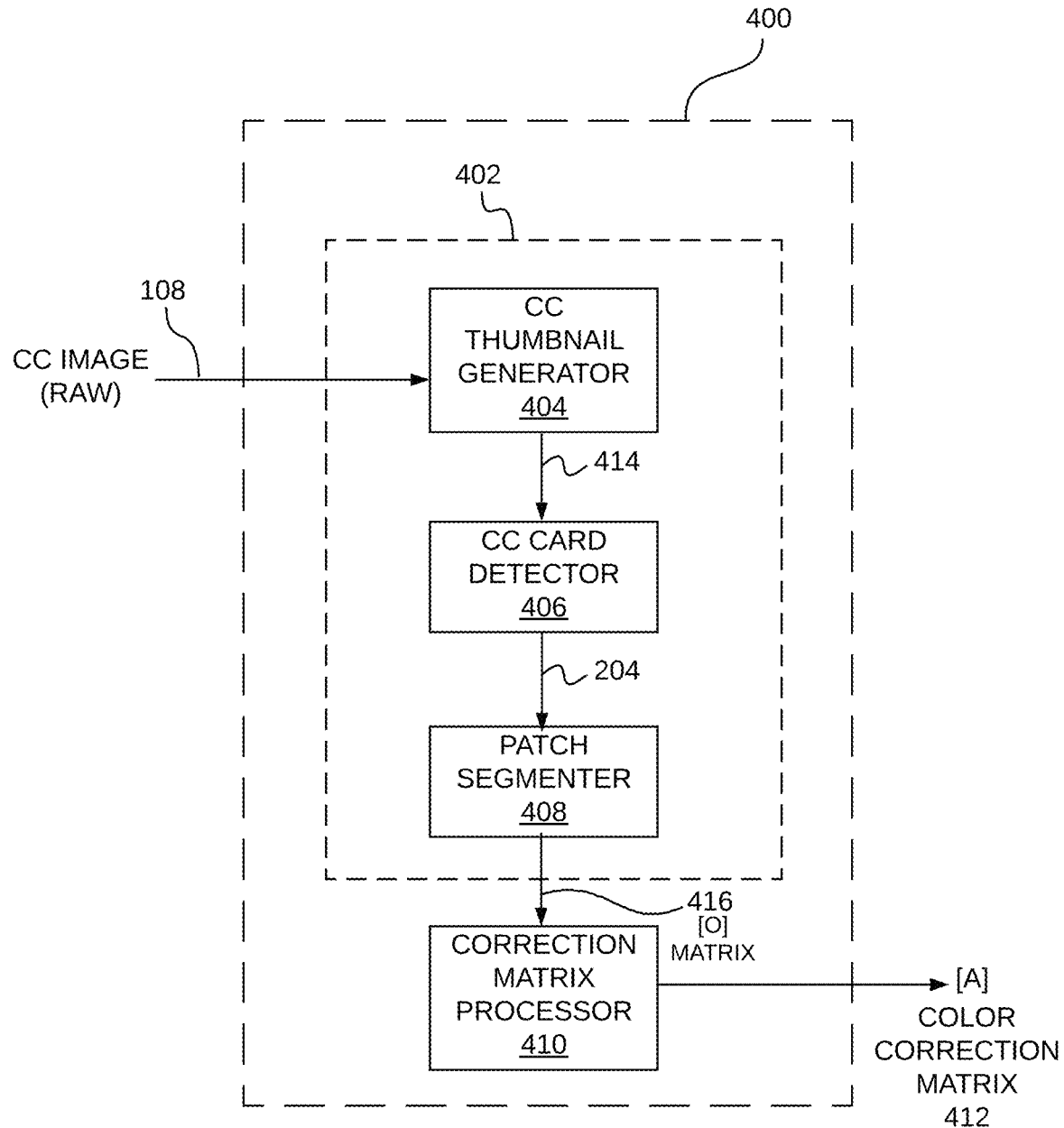
FIG. 4 shows a correction information generator 400.

FIG. 4 is a diagram of a correction information generator 400 in accordance with one embodiment. For example, the correction information generator 400 is suitable for use as the correction information generator 102 shown in FIG. 1. The correction information generator 400 comprises a color checker processor 402 and a correction matrix processor 410. The color checker processor 402 comprises a color checker (CC) thumbnail generator 404, a color checker card detector 406, and a patch segmenter 408.

In one embodiment, the color checker thumbnail generator 404 receives the raw color correction image 108 and generates a color correction thumbnail image 414. The color checker card detector 406 receives the color correction thumbnail image 414 and detects the presence of a color checker card 204 within the thumbnail image 414. The patch segmenter 408 identifies color patches within the detected color checker card 204 and determines an observed color for each patch to form the matrix [O] 416.

The correction matrix processor 410 performs matrix computations to determine a color correction matrix [A] 412. In one embodiment, the correction matrix processor 410 solves the following matrix equation.

$$P = \begin{bmatrix} P_{R1} & P_{G1} & P_{B1} \\ P_{BR2} & P_{G2} & P_{B2} \\ \cdots \\ P_{Rk} & P_{Gk} & P_{Bk} \end{bmatrix} = \begin{bmatrix} O_{R1} & O_{G1} & O_{B1} \\ O_{R2} & O_{G2} & O_{B2} \\ \cdots \\ O_{Rk} & O_{Gk} & O_{Bk} \end{bmatrix} \begin{bmatrix} A_{11} & A_{12} & A_{13} \\ A_{21} & A_{22} & A_{23} \\ A_{31} & A_{32} & A_{33} \end{bmatrix}$$

In the above equation ([P]=[O]*[A]), [O] are the identified colors read from the color checker patch segments in the color correction image, and [P] are referenced color values from the table 302 of color values. In one embodiment, the correction matrix processor 410 solves the above equation using a Nelder-Mead algorithm. However, other suitable algorithms can be used by the correction matrix processor 410 to solve the above equation to obtain the color correction matrix [A] 412. In one embodiment, the matrix [A] 412 forms the correction information 112 shown in FIG. 1.

Figure 5:
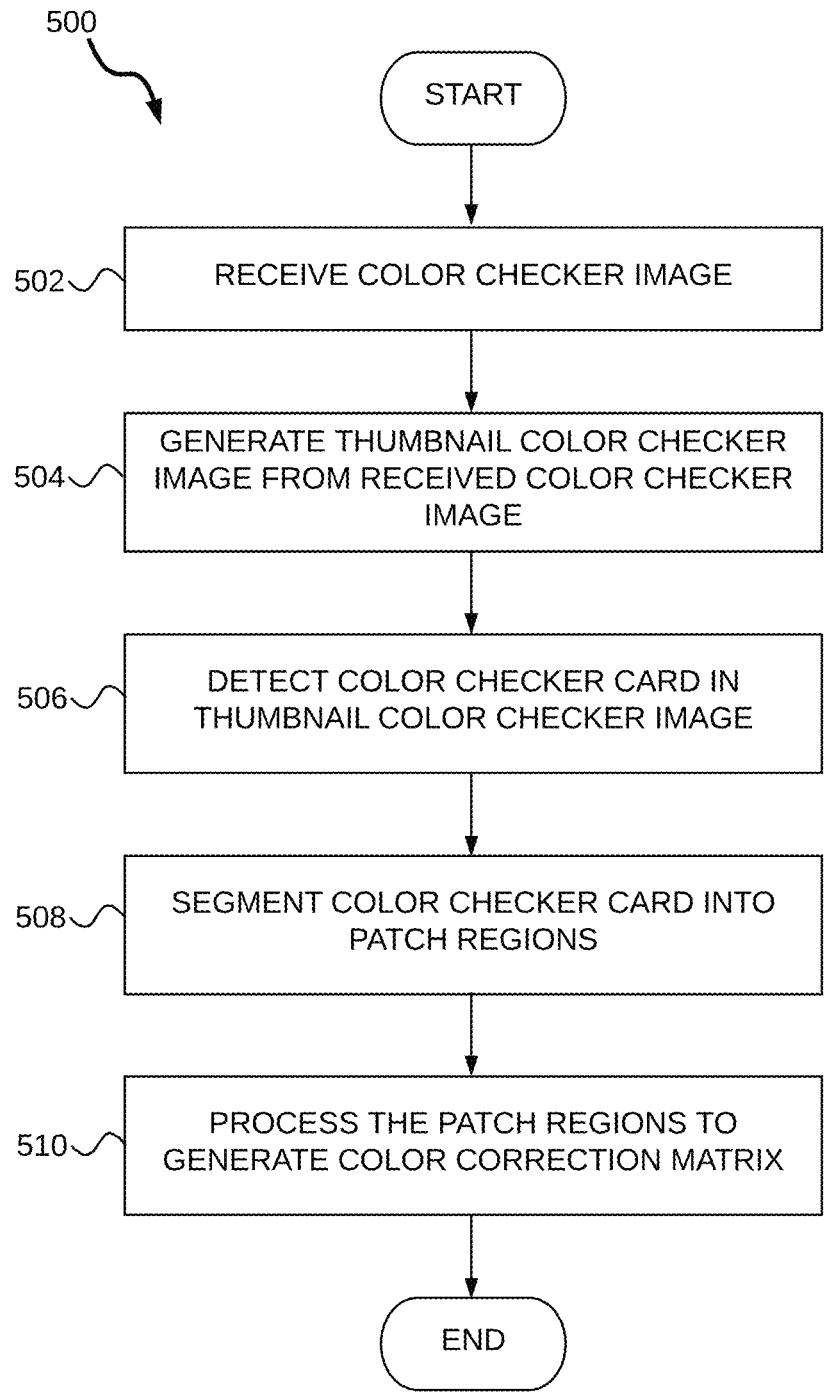
FIG. 5 is a flowchart of a method for generating color correction information in accordance with one novel aspect.

FIG. 5 is a flowchart of a method 500 for generating color correction information in accordance with one aspect. For example, method 500 is performed by the correction information generator 400 shown in FIG. 4 to generate the color correction matrix [A] 412.

At block 502, a color correction image is received. For example, the CC thumbnail generator 404 receives the color correction image 108.

At block 504, a thumbnail color checker image is generated from the received color correction image. For example, the CC thumbnail generator 404 generates the color correction thumbnail image 414.

Figure 6:
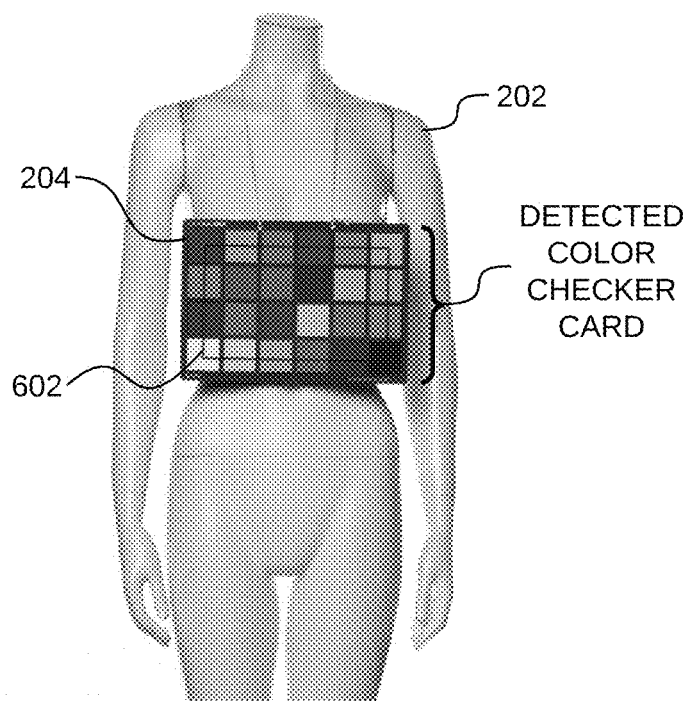
FIG. 6 shows a color correction image that illustrates a detected color checker card and a detection rectangle.

At block 506, the thumbnail color checker image is processed to detect a color checker card. For example, the CC card detector 406 performs this operation. In one embodiment, an edge-detection algorithm is performed by the CC card detector 406 to detect for the presence of the color checker card within the color correction thumbnail image 414. As illustrated in FIG. 6, edge detection is used to detect the color checker card 204 in the color correction image.

Figure 7:
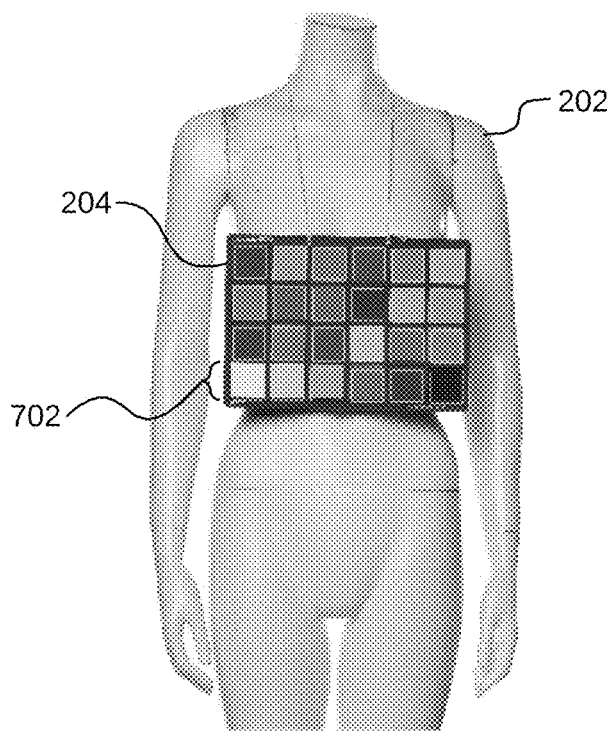
FIG. 7 shows a color correction image that illustrates a detected color checker card and identified color patches or segments.

At block 508, the detected color checker card is segmented into patch regions. For example, the patch segmenter 408 performs this operation. In one embodiment, the patch segmenter 408 uses the size and location of the detected color checker card to identify the patch regions. For example, as illustrated in FIG. 7, the edges of the detected color correction card 204 are used to generate patch regions (e.g., patch region 702).

Next, a detection rectangle is generated by the patch segmenter 408 to pass through a plurality of patch segments. For example, as illustrated in FIG. 6, a detection rectangle 602 is generated by the patch segmenter 408 based on the boundary edges of the detected color correction card 204. This detection rectangle 602 is defined so as to pass through a plurality of patch segment locations based on the detected location of the color correction card 204.

Next, the patch segmenter 408 reads a plurality of pixels along the detection rectangle 602 in a predefined block size within each patch. For example, in one embodiment, a block size of 30×30 pixels is used to read pixel color values within each block along the detection rectangle 602. Then the median pixel color value is selected as the observed color value for the patch. The observed color values for the patches form the matrix [O] 416 described above.

At block 510, the patch regions are processed to generate the color correction matrix. In one embodiment, the color correction processor 410 solves the equation ([P]=[O]*[A]) to determine the color correction matrix [A] 412, which represents the color correction information 112.

Thus, method 500 operates to generate correction information in accordance with one novel aspect. It should be noted that the operations of method 500 are exemplary and that the operations can be changed, added to, deleted, rearranged, or otherwise modified within the scope of the embodiments.

FIG. 6 shows a color correction image that illustrates the detected color checker card 204 and the detection rectangle 602.

FIG. 7 shows a color correction image that illustrates a detected color checker card 204 and identified color patches or segments (e.g., patch 702).

Figure 8:
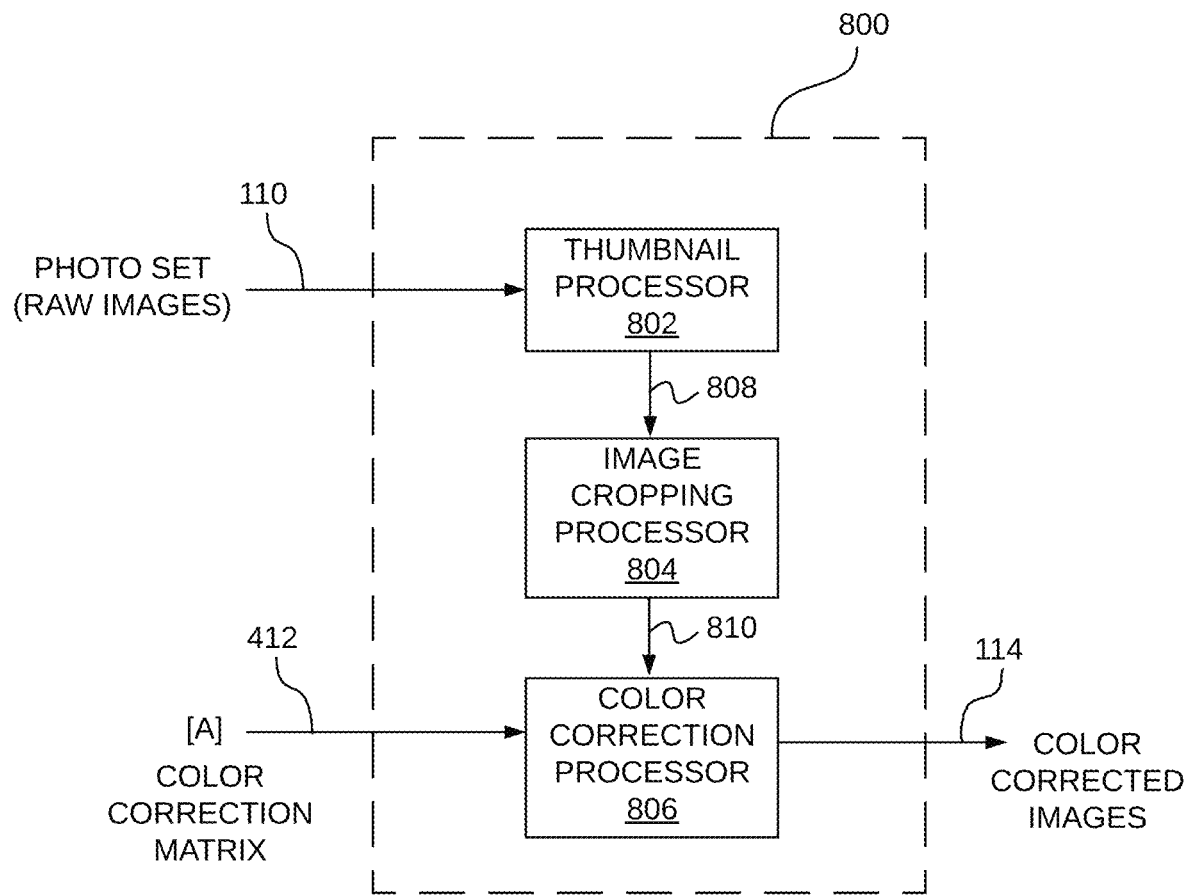
FIG. 8 is a diagram showing an image processor for generating color corrected images.

FIG. 8 is a diagram showing an image processor 800 for generating-color corrected images. For example, the image processor 800 is suitable for use as the image processor 104 shown in FIG. 1. In one embodiment, the image processor 800 comprises thumbnail processor 802, image-cropping processor 804, and color-correction processor 806.

During operation, the images of a photo set 110 are input to the thumbnail processor 802, which generates thumbnail images 808 of the images in the photo set. The output of the thumbnail processor 802 is input to the image-cropping processor 804, which crops the thumbnail images 808 to remove artifacts that may be in the thumbnail images 808 to generate cropped images 810. The cropped images 810 output from the image-cropping processor 804 is input to the color-correction processor 806. The color correction processor 806 also receives the color correction matrix [A] 412 and uses matrix 412 to correct the colors of the images of the photo set 110 to generate the color-corrected images 114.

Figure 9:
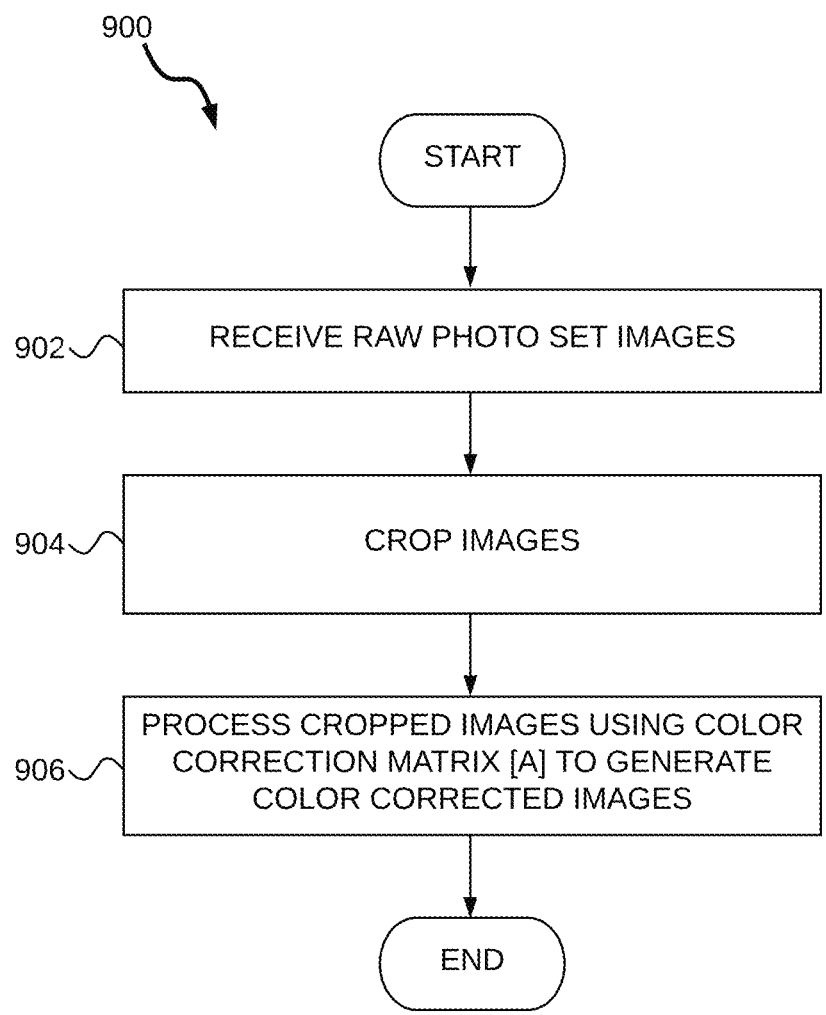
FIG. 9 is a flowchart of a method 900 for generating color-corrected images.

FIG. 9 is a flowchart of a method 900 for generating color-corrected images. In one embodiment, method 900 is performed by the image processor 800 shown in FIG. 8.

At block 902, raw photo set images are received. For example, the photo set images 110 are received by the thumbnail processor 802 that generates thumbnail images 808.

At block 904, the thumbnail images are cropped. For example, the image cropping processor 804 crops the thumbnail images 808 to generate cropped images 810.

At block 906, the cropped images are processed using the color correction matrix [A] to generate color-corrected images. For example, the color correction processor 806 receives the cropped images 810 and the color correction matrix [A] 412 and processes the images 810 to generate the color-corrected images 114. In one embodiment, the image is linearized by converting the image from sRGB image space to RGB image space. Next, the converted image is multiplied by the correction matrix. Next, exposure in the image is corrected. Next, the image is converted back to sRGB image space.

Thus, method 900 operates to generate color-corrected images in accordance with one novel aspect. It should be noted that the operations of method 900 are exemplary and that the operations can be changed, added to, deleted, rearranged, or otherwise modified within the scope of the embodiments.

Figure 10:
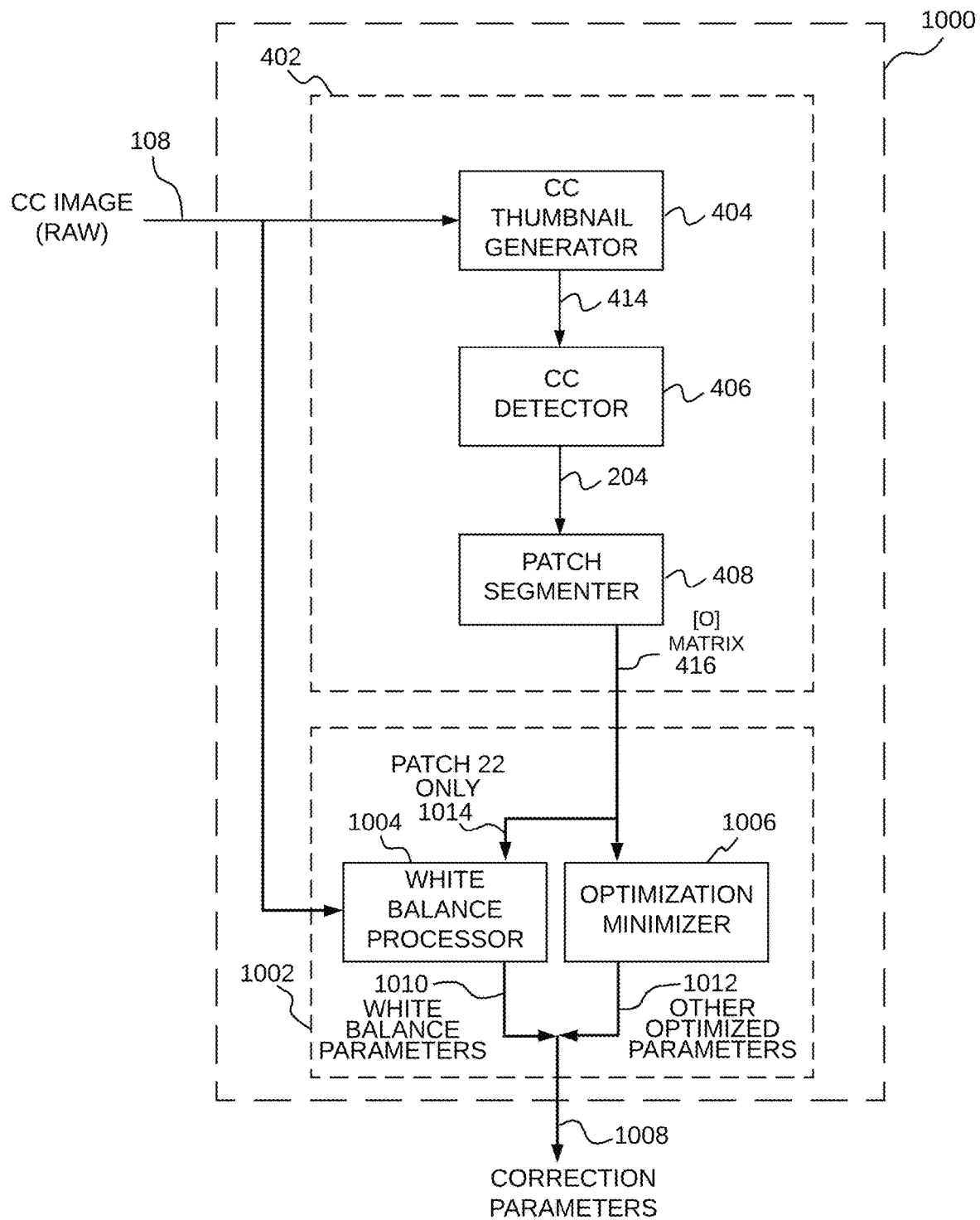
FIG. 10 is a diagram of a correction information generator in accordance with another novel aspect.

FIG. 10 shows an alternative embodiment of a correction information generator 1000. For example, the correction information generator 1000 is suitable for use as the correction information generator 102 shown in FIG. 1.

The correction information generator 1000 comprises the color checker processor 402, which includes the color checker thumbnail generator 404, the color checker detector 406, and the patch segmenter 408. The correction information processor 1000 also comprises a white balance and parameter detector 1002 that includes a white balance processor 1004 and an optimization minimizer 1006.

During operation, the white balance processor 1004 receives the raw color checker image 108 and a neutral gray patch 22 value from the patch segmenter 408. The white balance processor 1004 processes the patch 22 value and the raw image 108 to determine desired white balance values.

In one embodiment, the white balance processor 1004 compares the red/green/blue (RGB) values of the patch 22 from the patch segmenter 408 and compares them to the reference values for the patch 22 from the color checker card. In one embodiment, the observed patch 22 values are adjusted to be the same as the reference values. In one embodiment, to adjust the values, the value for the green channel is fixed and the red and blue channels are adjusted to be the same as the green channel. To apply, all channels will be multiplied by the determined white balance factor.

In another embodiment, the raw image 108 does not have brightness adjusted. To correct this, a library is accessed to get other optimized parameters to optimize the raw image 108. The result is that the correction parameters 1008 comprises two sets of parameters, white balance parameters 1010 and other optimized parameters 1012 that are stored and applied to the raw images 108.

The optimization minimizer 1006 generates the other optimized parameters 1012, such as exposure, gamma, and brightness, which are optimized separately using all patches provided in the "O" matrix 416.

In one embodiment, the application of parameters to the images is done through library functions. The library functions allow a variety of parameters to be applied to pixels in an image for image correction. In one embodiment, the Nelder-Mead method provides library functions to solve optimization, such as the library for optimization (CFI). Some examples of an initial set of values to be set for optimization include the following.

Figure 11:
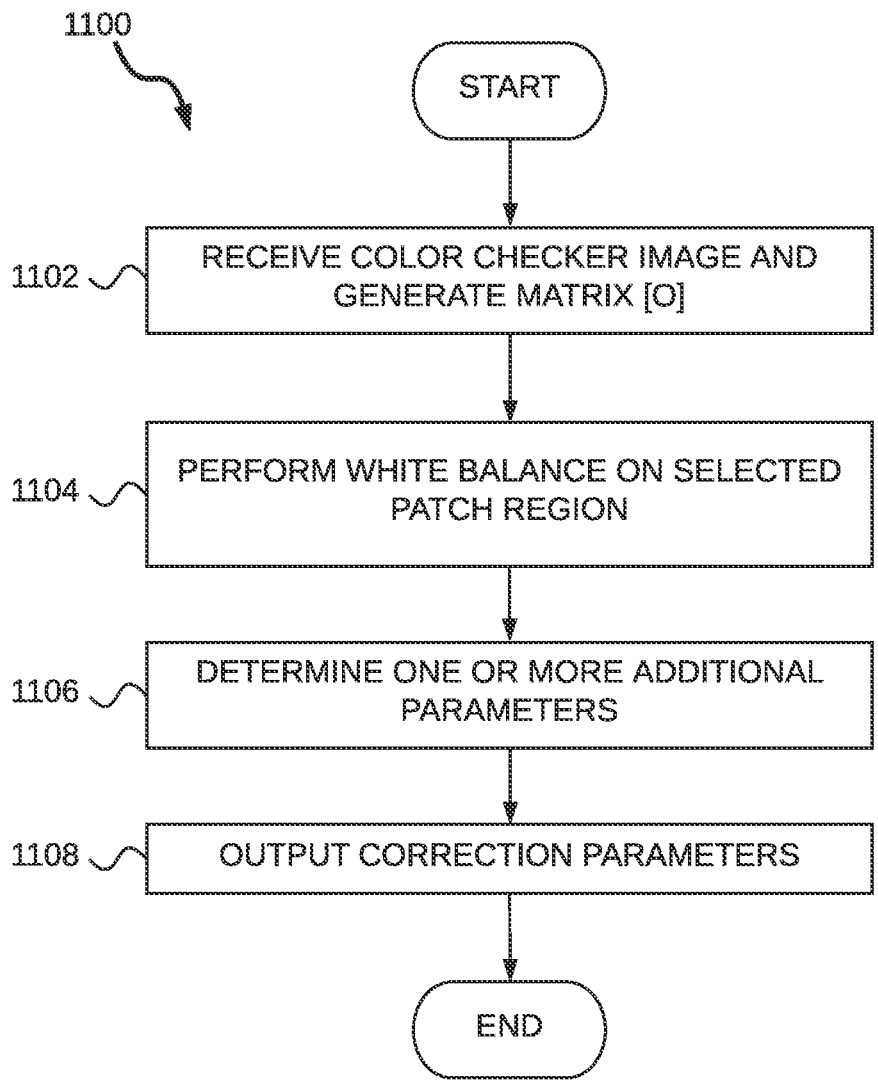
FIG. 11 is a flowchart of a method for generating correction information in accordance with another novel aspect.

A. exposure (exp_shift)—time camera lens is open
B. brightness
C. gamma to compress colors
D. contrast FIG. 11 is a flowchart of a method 1100 for generating color correction information. For example, method 1100 is performed by the alternative correction information generator 1000 shown in FIG. 10.

At block 1102, a color checker image is received by the color checker processor 402 which generates the patch 22 value as described above.

At block 1104, a white balance is performed using the patch 22 value. For example, the white balance processor 1004 receives the patch 22 value and the raw image 108 and determines white balance parameters 1010 for patch region 22 of the color checker card. For example, the white balance operation is performed by fixing one of the three channels (e.g. green) and adjusting the other two channels (e.g. red and blue) to have the same value on the gray patch of the color checker card.

At block 1106, one or more additional parameters are determined. For example, the optimization minimizer 1006 determines the one or more additional parameters 1012 from the [O] matrix 416. In one embodiment, the additional parameters 1012 include one or more of exposure, gamma, and brightness parameters.

At block 1108, the correction parameters are output. For example, the determined white balance parameters 1010 and the one or more additional parameters 1012 are output as the correction parameters 1008. The correction parameters represent the color correction information.

Thus, method 1100 operates to provide an alternative method for generating color correction information in accordance with one novel aspect. It should be noted that the operations of method 1100 are exemplary and that the operations can be changed, added to, deleted, rearranged, or otherwise modified within the scope of the embodiments.

Figure 12:
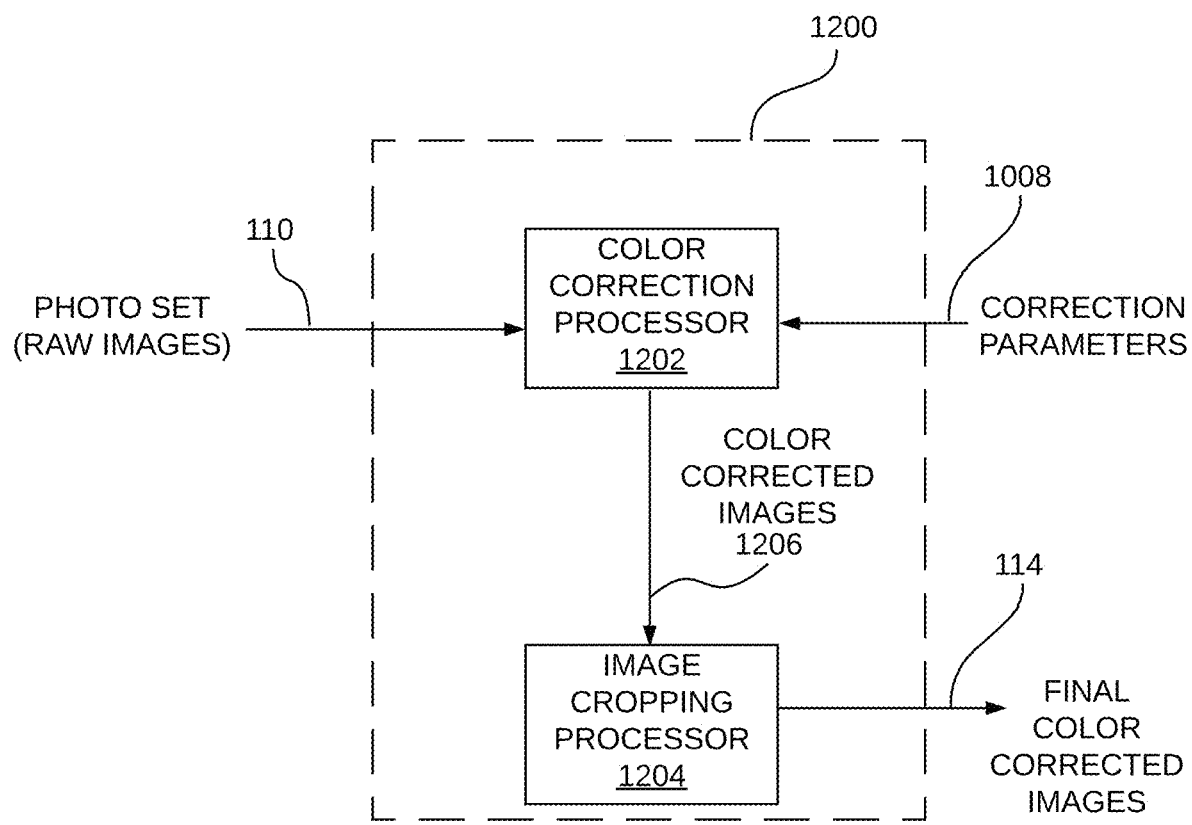
FIG. 12 is a diagram of an image processor in accordance with one novel aspect.

FIG. 12 shows an alternative embodiment of an image processor 1200. For example, the image processor 1200 is suitable for use as the image processor 104 shown in FIG. 1. The image processor 1200 comprises a color correction processor 1202 and an image cropping processor 1204. During operation, the color correction processor 1202 receives raw photo set images 110 and the correction parameters 1008. The color correction processor 1202 processes the photo set images 110 with the correction parameters 1008 to generate color-corrected images 1206. The image-cropping processor 1204 receives the color-corrected images 1206 and crops these images to generate the final color-corrected images 114.

Figure 13:
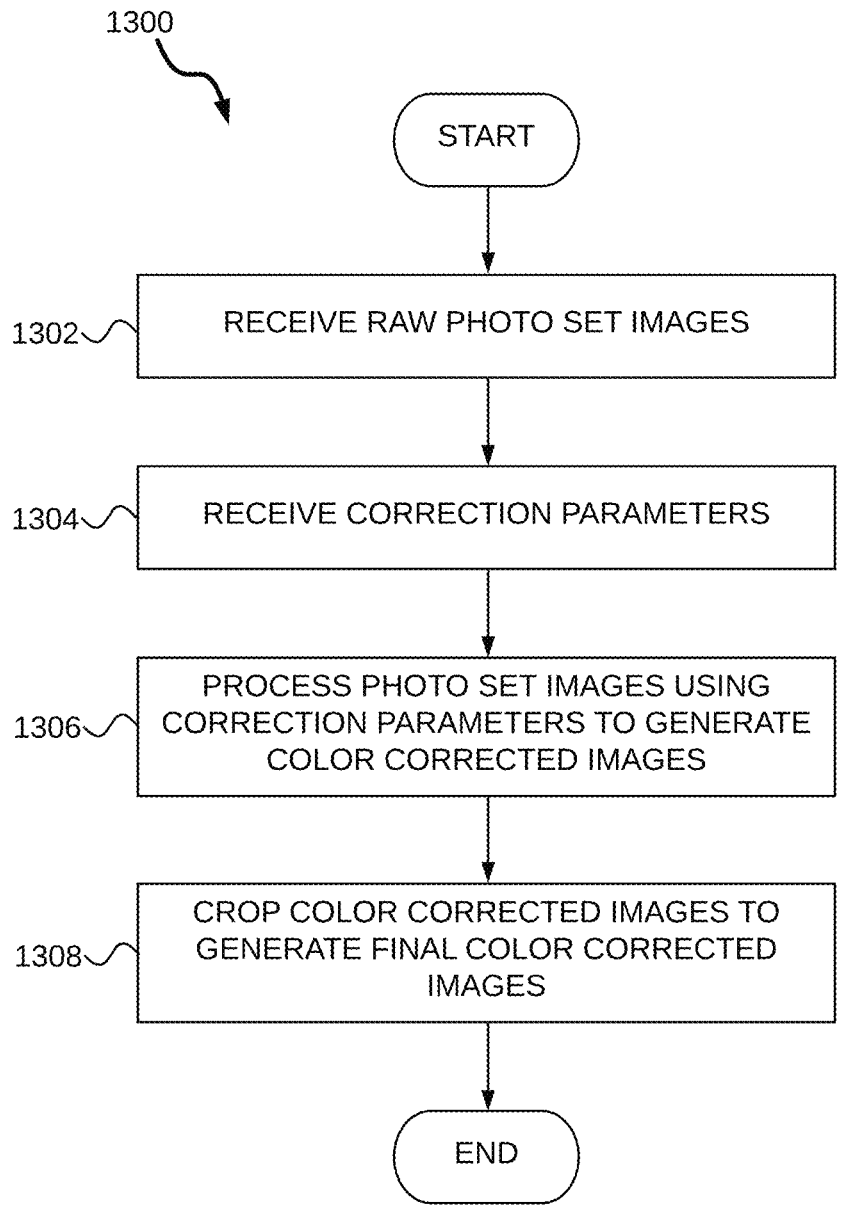
FIG. 13 is a flowchart of a method for generating color-corrected images.

FIG. 13 is a flowchart of a method 1300 for generating color-corrected images. For example, the alternative image processor 1200 performs the operations of the method 1300 to generate color-correct images.

At block 1302, raw photo set images 110 are received by the color correction processor 1202.

At block 1304, correction parameters 1008 are received by the color correction processor 1202.

At block 1306, the correction parameters 1008 are used to process the raw photo set images 110 to generate color-corrected images 1206.

At block 1308, the color-corrected images 1206 are cropped to generate the final color-corrected images 114.

Thus, method 1300 operates to provide an alternative method for generating color-corrected images in accordance with one novel aspect. It should be noted that the operations of method 1300 are exemplary and that the operations can be changed, added to, deleted, rearranged, or otherwise modified within the scope of the embodiments.

Figure 14:
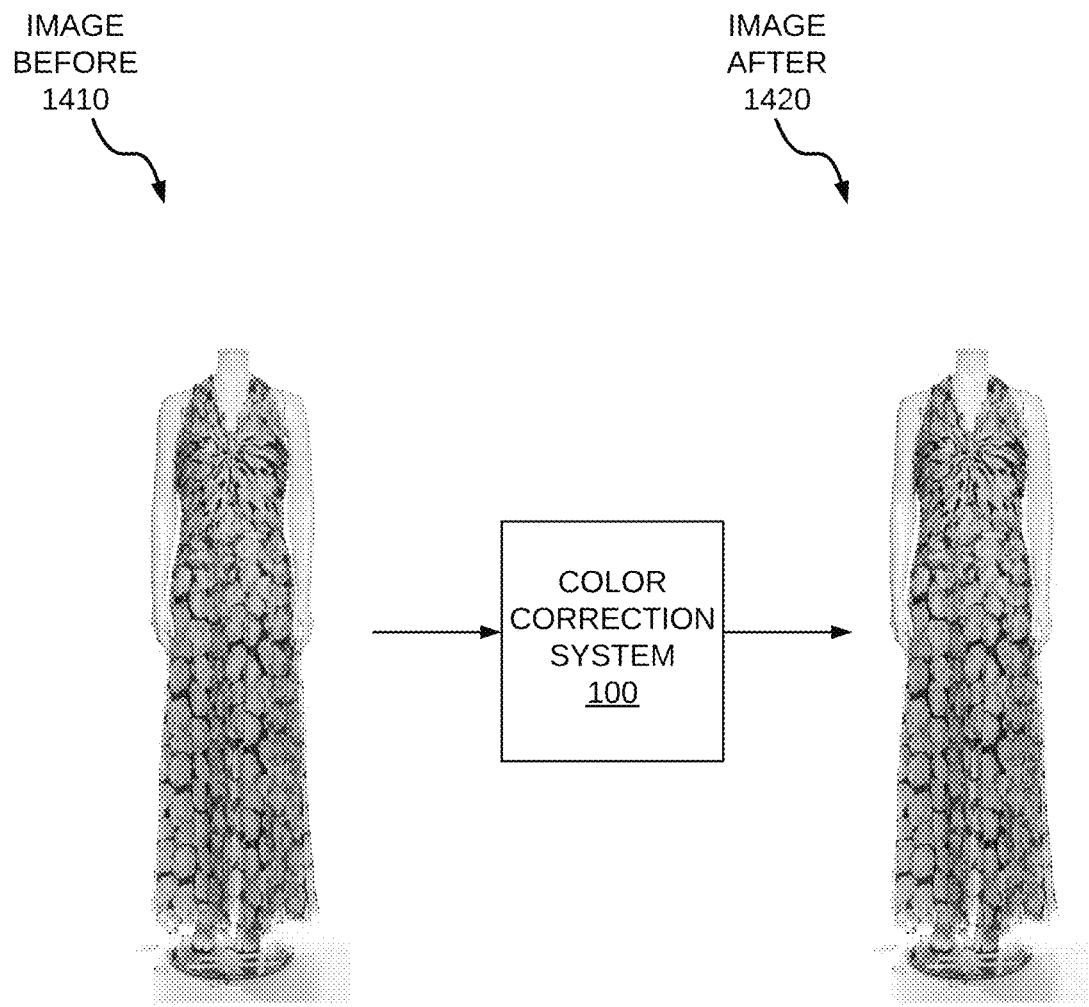
FIG. 14 shows an example of an image before and after color correction.

FIG. 14 shows an example of an image before and after color correction performed by the color correction system 100. The image 1410 is before color correction and the image 1420 is after color correction by the color correction system 100. Image 1420 has truer characteristics and colors as compared to image 1410. Image 1420 is more visually consistent to the actual product as compared to image 1410.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
a correction information generator that generates color correction information from a color correction image associated with a plurality of images, wherein the correction information generator processes an image of a color checker card in the color correction image to generate the color correction information, and wherein the correction information generator processes the image of the color checker card by performing operations of:
generating a thumbnail image of the color correction image;
detecting the image of the color checker card in the thumbnail Image of the color correction image; and
detecting color checker patch segments in the detected image of the color checker card, wherein the correction information generator generates a color correction matrix [A] from the color checker patch segments, and wherein the color correction matrix [A] represents the color correction information; and
an image processor that automatically processes the plurality of images based on the color correction information to generate a plurality of color-corrected images.

2. The system of claim 1, wherein the correction information generator generates the color correction matrix [A] by solving a matrix equation [P]=[O]*[A], wherein O are identified colors from the color checker patch segments, and wherein P are referenced colors of the color checker card.

3. A system comprising:
a correction information generator that generates color correction information from a color correction image associated with a plurality of images, wherein the correction information generator processes an image of a color checker card in the color correction image to generate the color correction information, and wherein the correction information generator processes the image of the color checker card by performing operations of:
generating a thumbnail image of the color correction image;
detecting the image of the color checker card in the thumbnail image of the color correction image; and
detecting color checker patch segments in the detected image of the color checker card, wherein the correction information generator generates a color correction matrix [A] from the color checker patch segments, and wherein the color correction matrix [A] represents the color correction information; and
an image processor that automatically processes the plurality of images based on the color correction information to generate a plurality of color-corrected images, wherein the image processor automatically processes each image in the plurality of images by performing operations of:
generating a thumbnail image of each image in the plurality of images;
cropping the thumbnail image of each image in the plurality of images to generate a cropped image; and
processing the cropped image with the color correction matrix [A] to generate a color-corrected version of the cropped image.

4. A system comprising:
a correction information generator that generates color correction information from a color correction image associated with a plurality of images, wherein the correction information generator processes an image of a color checker card in the color correction image to generate the color correction information, and wherein the correction information generator processes the image of the color checker card by performing operations of:
generating a thumbnail image of the color correction image;
detecting the image of the color checker card in the thumbnail image of the color correction image; and
detecting color checker patch segments in the detected image of the color checker card;

an image processor that automatically processes the plurality of Images based on the color correction information to generate a plurality of color-corrected images;

a white balance processor that performs a white balance operation on a selected color checker patch segment to generate white balance parameters; and an optimization minimizer that processes the color checker patch segments to generate one or more additional parameters comprising at least one of exposure, gamma, and brightness parameters, wherein the white balance parameters and the one or more additional parameters form correction parameters that represent the color correction information.

5. The system of claim 4, wherein the selected color checker patch segment is segment number 22.

6. The system of claim 4, wherein the image processor automatically processes each image in the plurality of images by performing operations of:

applying the correction parameters to each image in the plurality of images to generate the plurality of color-corrected images; and cropping the color-corrected images to generate final color-corrected images.

* * * * *

UNITED STATES PATENT AND TRADEMARK OFFICE
CERTIFICATE OF CORRECTION

| | | |
|---|---|---|
| PATENT NO. | : 12,254,532 B1 | Page 1 of 1 |
| APPLICATION NO. | : 18/092304 | |
| DATED | : March 18, 2025 | |
| INVENTOR(S) | : Ramdasi et al. | |

It is certified that error appears in the above-identified patent and that said Letters Patent is hereby corrected as shown below:

In the Claims

Column 8, Line 2, currently reads as:
thumbnail Image of the color correction image; and And should read as:
thumbnail image of the color correction image; and Column 9, Line 2, currently reads as:
rality of Images based on the color correction informa- And should read as:
rality of images based on the color correction informa- Signed and Sealed this
Twenty-second Day of April, 2025

Coke Morgan Stewart
*Acting Director of the United States Patent and Trademark Office*